US011505653B2

(12) United States Patent
Mahoney et al.

(10) Patent No.: US 11,505,653 B2
(45) Date of Patent: Nov. 22, 2022

(54) COMPOSITIONS AND METHODS OF MAKING A POLYMERIZED COMPOSITION

(71) Applicant: 3M INNOVATIVE PROPERTIES COMPANY, St. Paul, MN (US)

(72) Inventors: Wayne S. Mahoney, St. Paul, MN (US); Saswata Chakraborty, Oakdale, MN (US); Guy D. Joly, Shoreview, MN (US); Jonathan A. Anim-Addo, New Hope, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 306 days.

(21) Appl. No.: 16/632,501

(22) PCT Filed: Jul. 17, 2018

(86) PCT No.: PCT/IB2018/055300
§ 371 (c)(1),
(2) Date: Jan. 20, 2020

(87) PCT Pub. No.: WO2019/021115
PCT Pub. Date: Jan. 31, 2019

(65) Prior Publication Data
US 2020/0190263 A1 Jun. 18, 2020

Related U.S. Application Data

(60) Provisional application No. 62/536,098, filed on Jul. 24, 2017.

(51) Int. Cl.
*C08G 75/045* (2016.01)
*C08F 2/48* (2006.01)
*C08L 81/02* (2006.01)
*G02B 1/04* (2006.01)

(52) U.S. Cl.
CPC .............. *C08G 75/045* (2013.01); *C08F 2/48* (2013.01); *C08L 81/02* (2013.01); *G02B 1/04* (2013.01)

(58) Field of Classification Search
CPC ........ C09J 181/02; C08G 75/12; C08G 75/04; C08G 75/045; C07C 321/18; C07C 323/14; C08F 2/48; C08L 81/02; G02B 1/04
See application file for complete search history.

(56) References Cited

U.S. PATENT DOCUMENTS

| 5,399,624 A | 3/1995 | Glaser et al. |
| 5,876,805 A | 3/1999 | Ostlie |
| 2006/0052547 A1 | 3/2006 | Jethmalani et al. |

FOREIGN PATENT DOCUMENTS

| CN | 101368015 A | 2/2009 |
| CN | 101679669 A | 3/2010 |
| EP | 0586014 A | 3/1994 |
| EP | 0883653 | 12/1998 |
| JP | H08157320 A | 6/1996 |
| JP | 9-3058 A | 1/1997 |
| JP | 2000053768 A | 2/2000 |
| JP | 3807759 | 5/2006 |
| JP | 2013-071959 | 4/2013 |
| JP | 2013-091743 | 5/2013 |
| JP | 2015-048369 | 3/2015 |
| JP | 2015-168817 | 9/2015 |
| JP | 2015-191808 | 11/2015 |
| KR | 101546625 B1 | 8/2015 |
| WO | WO 2016145359 | 9/2016 |

OTHER PUBLICATIONS

NTT Advanced Technology Corporation, High refractive index/low refractive index resins, 2000, 6 pages.
International Search report for PCT International Application No. PCT/IB2018/055300 dated Oct. 19, 2018, 4 pages.

*Primary Examiner* — Shane Fang
(74) *Attorney, Agent, or Firm* — Bradford B. Wright

(57) ABSTRACT

A composition comprising at least one terminally-unsaturated diarylsulfide compound represented by the formula: wherein each R represents an allyl group or a propargyl group. The composition may further comprise an organic polythiol, and optionally a free-radical initiator, and may be formulated as a two-part polymerizable composition. Methods of polymerizing the compositions are also disclosed.

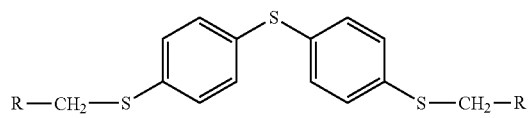

15 Claims, No Drawings

COMPOSITIONS AND METHODS OF MAKING A POLYMERIZED COMPOSITION

TECHNICAL FIELD

The present disclosure broadly relates to unsaturated compounds with high index of refraction, suitable for use as an -ene or -yne component in thiol-ene and thiol-yne polymerizations, respectively.

BACKGROUND

The thiol-ene reaction is a reaction between a thiol and an alkene to form an alkyl sulfide

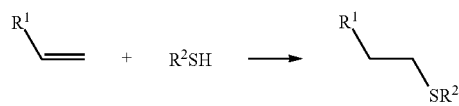

wherein $R^1$ and $R^2$ represent organic groups (e.g., alkyl or aryl).

Likewise, the thiol-yne reaction is a reaction between a thiol and an alkyne to produce an alkenyl sulfide (also known as a vinyl sulfide), as illustrated below:

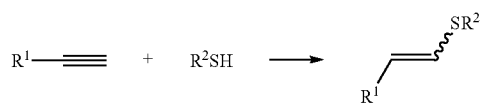

The vinyl sulfide is capable of undergoing further reaction through addition of a second thiol to the vinyl sulfide to generate a dithioether as shown below:

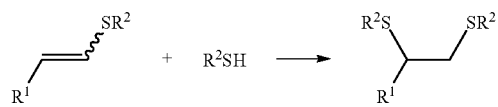

Both reactions are often facilitated by a free-radical initiator and/or UV irradiation, and have been used for polymer synthesis. Advantageously, the resulting products of thiol-ene and thiol-yne coupling may have a relatively high refractive index (also termed "high index"), and can be useful as optical materials in applications such as communications, sensors, computing, and displays.

SUMMARY

The present disclosure describes the preparation of aromatic thioether compounds having terminal alkene and/or alkyne functionality and compositions containing them. Advantageously, these compositions are suitable for use in making high index optical materials.

In a first aspect, the present disclosure provides a composition comprising at least one compound represented by the formula:

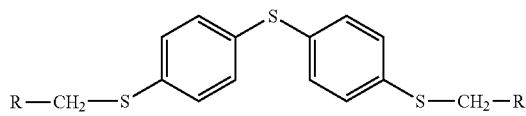

wherein each R represents an allyl group or a propargyl group. The composition may be combined with an organic polythiol having at least two sulfhydryl groups and a free-radical photoinitiator, and then at least partially polymerized to form a polymerized composition.

In a second aspect, the present disclosure provides a two-part polymerizable composition comprising a part A component and a part B component, wherein:

the part A component comprises a compound represented by the formula:

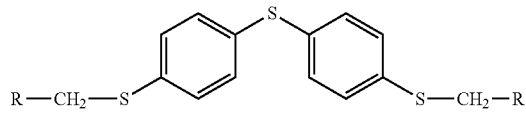

wherein each R represents an allyl group or a propargyl group; and the part B component comprises an organic polythiol compound having at least two sulfhydryl groups, wherein the part A and Part B components are not in intimate contact with each other.

Parts A and B may be combined, and then the resulting combination at least partially polymerized to form a polymerized composition.

In some embodiments, the polymerized compositions may include a polymer comprising divalent segments represented by at least one of the formulas:

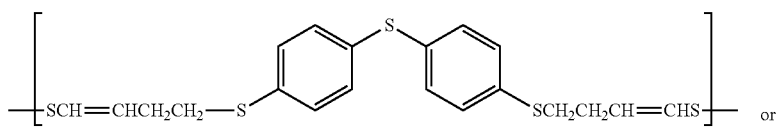 or

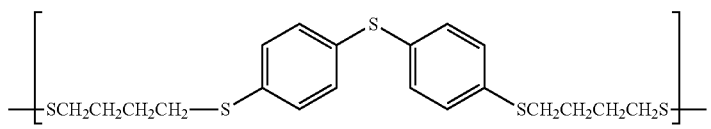

In some embodiments, resulting from addition of two thiols to each alkynyl group, the compositions may comprise tetravalent monomeric units represented by the formula:

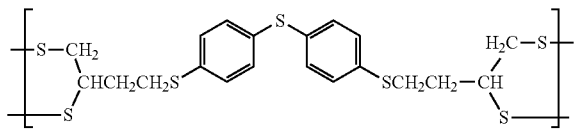

It is also in the scope of this disclosure to have less than complete reaction of the thiols with the alkenyl or alkynyl groups. One example of this would be trivalent unit formed from the reaction of three thiol groups to a dialkynyl molecule.

Advantageously, compositions according to the present disclosure may exhibit enhanced cure rates in thiol-ene/thiol-yne polymerizations as compared to previously known compounds.

As used herein, the term "polymerizable composition" means that at least some components of the composition can react to form a polymer under appropriate conditions.

Features and advantages of the present disclosure will be further understood upon consideration of the detailed description as well as the appended claims.

DETAILED DESCRIPTION

The composition comprises at least one terminally-unsaturated diarylsulfide compound represented by the formula:

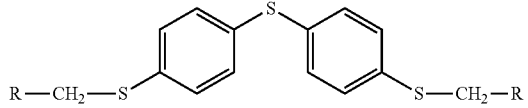

wherein each R represents an allyl group (i.e., —CH$_2$CH=CH$_2$) or a propargyl group (i.e., —CH$_2$C≡CH).

Terminally-unsaturated diarylsulfide compounds according to the present disclosure can be made, for example, by procedures described in the Examples section hereinafter. In one exemplary method, 4,4'-thiobisbenzenethiol is treated with aqueous sodium hydroxide in N,N-dimethylformamide (DMF) followed by addition of 4-bromobut-1-ene (as in Example 1) or 4-bromobut-1-yne (as in Example 2).

Either or both of these terminally-unsaturated diarylsulfide compounds can be combined with an organic polythiol compound having at least two, or at least three, sulfhydryl groups (e.g., 2, 3, 4, 5, or 6 sulfhydryl (—SH) groups, or more).

Organic polythiols useful in practice of the present disclosure have at least two thiol groups and are preferably free of hydrophilic and free-radically polymerizable groups. Useful polythiols are also preferably free of disulfide linkages that may impart chemical and/or thermal instability to any crosslinked or cured polymerized composition. The use of di-, tri-, and tetra-functional polythiols is also contemplated in the present disclosure. The polythiols may be aliphatic or aromatic and may be monomeric or polymeric. Since aromatic compounds are more susceptible to color formation, aliphatic polythiols are typically preferred. The polythiols may be used alone or in combination with one another.

Useful polythiols may have the formula $R^3$—$(SH)_n$, where n is at least 2, and preferably 2-4, and $R^3$ is an aliphatic organic group of valence n, where n is an integer. $R^3$ may be a polymeric or non-polymeric organic group that has a valence of n and is preferably selected from polyvalent aliphatic compounds having 2 to 30 carbon atoms and optionally one to four catenary heteroatoms of oxygen, nitrogen or sulfur, and optionally one to four ester linkages. $R^3$ may comprise a polyoxyalkylene, polyester, polyolefin, polyacrylate, or polysiloxane backbone. With respect to n, it will be recognized that while in an individual molecule n is always an integer, for mixtures of thiols with different degrees of functionality the average value of n for the total of all polythiols may represent a non-integer average.

In one embodiment, $R^3$ comprises a non-polymeric aliphatic or cycloaliphatic moiety having from 2 to 30 carbon atoms. In another embodiment, $R^3$ comprises a polyoxyalkylene, polyester, polyolefin, polyacrylate, or polysiloxane polymer having pendent or terminal reactive —SH groups. Useful polymers include, for example, thiol-terminated polyethylenes or polypropylenes, and thiol-terminated poly(alkylene oxides).

Specific examples of useful polythiols include dimercaptodiethyl sulfide; 1,6-hexanedithiol; 1,8-dimercapto-3,6-dithiaoctane; propane-1,2,3-trithiol; 1,2-bis[(2-mercaptoethyl)thio]-3-mercaptopropane; tetrakis(7-mercapto-2,5-dithiaheptyl)methane; and trithiocyanuric acid.

Another useful class of polythiols includes those obtained by esterification of a polyol with a terminal thiol-substituted carboxylic acid (or derivative thereof such as esters or acyl halides) including α- or β-mercaptocarboxylic acids such as thioglycolic acid or β-mercapto-propionic acid.

Useful examples of compounds thus obtained include ethylene glycol bis(thioglycolate), pentaerythritol tetrakis(3-mercaptopropionate), ethylene glycol bis(3-mercaptopropionate), trimethylolpropane tris(thioglycolate), trimethylolpropane tris(3-mercaptopropionate), pentaerythritol tetrakis (thioglycolate), and pentaerythritol tetrakis(3-mercaptopropionate), all of which are commercially available. A specific example of a preferred polymeric polythiol is polypropylene ether glycol bis(3-mercaptopropionate) which is prepared from polypropylene-ether glycol and 3-mercaptopropionic acid by esterification. Poly-2-mercaptoacetate or poly-3-mercaptopropionate esters, particularly the trimethylolpropane triesters or pentaerythritol tetraesters are preferred.

Particularly useful polythiols include pentaerythritol tetrakis(3-mercaptopropionate) (PETMP), trimethylolpropane trimercaptoacetate, and trimethylolpropane tris (3-mercaptopropionate) (TMPTMP), tris[2-(3-mercaptopropionyloxy)ethyl]isocyanurate, 2,3-di((2-mercaptoethyl)thio)-1-propanethiol ((DMPT) Bruno Bock Thiochemicals, Marschacht, Germany), 1,8-dimercapto-3,6-dioxaoctane (DMDO), 1,8-dimercapto-3,6-dithiaoctane (DMDT), and bis(2-mercaptoethyl) sulfide.

The polymerizable composition may optionally, but preferably, further comprise at least one free-radical initiator, which improves the rate of cure and percent conversion of the polymerizable compositions. The free-radical initiator may comprise at least one thermal initiator (e.g., a peroxide or an azo compound (e.g., azobisisobutyronitrile (AIBN))), at least one free-radical photoinitiator (hereinafter "photoinitiator"), or a combination thereof. The photoinitiator, if present, is preferably used in an amount of less than 2 weight percent, preferably less than 0.1 weight percent, and more preferably less than 0.05 weight percent, based on the total weight of the polymerizable composition, although higher amounts may also be used. In some embodiments, the polymerizable compositions contain no photoinitiator.

Many suitable photoinitiators are known in the art and are available from commercial suppliers. Exemplary useful photoinitiators may include benzophenones, benzoin and its derivatives such as α-methylbenzoin; α-phenylbenzoin; α-allylbenzoin; α-benzylbenzoin; benzoin ethers such as benzil dimethyl ketal (e.g., available as OMNIRAD 651 from IGM Resins USA Inc., Charlotte, N.C.), benzoin methyl ether, benzoin ethyl ether, benzoin n-butyl ether; acetophenone and its derivatives such as 2-hydroxy-2-methyl-1-phenyl-1-propanone (e.g., available as OMNIRAD 1173 from IGM Resins USA Inc.) and 1-hydroxycyclohexyl phenyl ketone (e.g., available as OMNIRAD 184 from IGM Resins USA Inc.); 2-methyl-1-[4-(methylthio) phenyl]-2-(4-morpholinyl)-1-propanone (e.g., available as OMNIRAD 907 from IGM Resins USA Inc.); 2-benzyl-2-(dimethylamino)-1-[4-(4-morpholinyl)phenyl]-1-butanone (e.g., available as OMNIRAD 369 from IGM Resins USA Inc.) and phosphine oxide derivatives such as ethyl-2,4,6-trimethylbenzoylphenyl phosphinate (e.g., available as OMNIRAD TPO-L from IGM Resins USA Inc.), and bis-(2,4,6-trimethylbenzoyl)-phenylphosphine oxide (e.g., available as OMNIRAD 819 from IGM Resins USA Inc.).

Preferred photoinitiators include ethyl (2,4,6-trimethylbenzoyl) phenyl phosphinate (available as OMNIRAD TPO-L from IGM Resins USA Inc.), (2,4,6-trimethylbenzoyl)-diphenylphosphine oxide, 2,4,6-trimethylbenzoyl diphenyl phosphinate, bis(2,4,6-trimethylbenzoyl)phenylphosphine oxide, 1-hydroxycyclohexyl phenyl ketone (available as OMNIRAD 481 from IGM Resins USA Inc.), and 2-hydroxy-2-methyl-1-phenyl-propan-1-one (available as OMNIRAD 73 from IGM Resins USA Inc.). Another preferred photoinitiator is a blend of 25% bis(2,6-dimethoxybenzoyl)-2,4,4-trimethylpentylphosphine oxide and 75% 2-hydroxy-2-methyl-1-phenyl-propan-1-one. Often, mixtures of photoinitiators provide a suitable balance of properties.

The amounts of the two components, the terminally-unsaturated alkenyl diarylsulfide compounds and the organic polythiol, may vary according to their molar equivalence in a ratio of terminally-unsaturated alkenyl diarylsulfide compounds/organic polythiol of, for example, from 1:1.2 to 1.2:1, preferably 1:1.1 to 1.1:1, more preferably 1:1.05 to 1.05:1, or even 1:1, although this may be varied (e.g., if addition ethylenically unsaturated compounds are present). With terminally-unsaturated alkynyl diarylsulfide compounds, the ratio of terminally-unsaturated alkynyl diarylsulfide compounds/organic polythiol of, for example, from 2.4:1 to 1:1, preferably 2.2:1 to 1.5:1, more preferably 2.1:1 to 1.8:1, or even 2:1.

The compositions can then be applied to the desired substrate or added to a mold and exposed to actinic radiation such as UV and/or visible light. The composition may be exposed to any form of actinic radiation such as, for example, visible and/or ultraviolet light, but is preferably exposed to UVA (320 to 390 nm) or UVV (395 to 445 nm) electromagnetic radiation. Generally, the amount of actinic radiation should be sufficient to form a solid mass that is not tacky to the touch, although this is not a requirement.

Photoinitiation energy sources emit actinic radiation, i.e., radiation having a wavelength of 700 nanometers or less, which is capable of producing, either directly or indirectly, free radicals capable of initiating addition polymerization and step-growth polymerization of the optical casting resins of the present disclosure. Preferred photoinitiation energy sources emit ultraviolet radiation, i.e., radiation having a wavelength between about 180 and 460 nanometers, including photoinitiation energy sources such as mercury arc lights; carbon arc lights; low, medium, or high pressure mercury vapor lamps; swirl-flow plasma arc lamps; microwave driven lamps; xenon flash lamps; ultraviolet light emitting diodes, and ultraviolet light emitting lasers.

Although not typically preferred, additional components may be included in the polymerizable compositions such as, for example, fillers (e.g., silica nanoparticles), flow aids, reactive diluent monomers, solvent, antistatic agents, anti-soiling agents (e.g., certain fluorinated compounds) and colorants.

While not typically desired, in some cases inclusion of an ethylenically unsaturated reactive diluent monomer may be desired to modify the viscosity of polymerizable compositions according to the present disclosure. Reactive diluent monomers may include, for example, acrylate monomers (e.g., phenoxyethyl acrylate, tetrahydrofurfuryl acrylate, hexanediol diacrylate, and trimethylolpropane triacrylate), methacrylate monomers (e.g., phenoxyethyl methacrylate, tetrahydrofurfuryl methacrylate, hexanediol dimethacrylate, and trimethylolpropane trimethacrylate), styrene, and substituted styrenes (e.g., 4-bromostyrene).

Useful mono- and poly-ethylenically unsaturated monomers are free radically polymerizable (meth)acrylates or (meth)acrylamides, where the term "(meth)acrylate" encompasses acrylate and/or methacrylate monomers. The monomer desirably has minimal absorbance at the wavelength of the radiation used to cure the composition. Such monomers may include, for example, n-butyl (meth)acrylate, isobutyl (meth)acrylate, hexyl (meth)acrylate, 2-ethylhexyl (meth) acrylate, benzyl (meth)acrylate, tetrahydrofurfuryl (meth) acrylate, 2-phenoxyethyl (meth)acrylate, isooctyl (meth) acrylate, caprolactone (meth)acrylate, isodecyl (meth) acrylate, tridecyl (meth)acrylate, lauryl (meth)acrylate, methoxy-polyethylene glycol-mono methacrylate, ethoxy-ethoxyethyl acrylate, and ethoxylated-nonyl acrylate. In some embodiments, the monomers are 2-ethylhexyl acrylate, ethoxyethoxyethyl acrylate, tridecyl acrylate and ethoxylated nonyl acrylate. High $T_g$ monomers having one ethylenically unsaturated group and a glass transition temperature of the corresponding homopolymer of 50° C. or more which are suitable in the present disclosure, include, for example, N-vinylpyrrolidone, N-vinyl caprolactam, isobornyl acrylate, acryloylmorpholine, isobornyl methacrylate, phenoxyethyl acrylate, phenoxyethyl methacrylate, methyl methacrylate, and acrylamide. Other suitable monomers include those 3-phenoxy benzyl acrylate available from Miwon Specialty Chemical Co. Ltd. (Korea) as M1122, 2-phenylphenoxyethyl acrylate available from Miwon Specialty Chemical Co. Ltd. as M1142, OPPA is 2-phenylphenyl acrylate available from Toagosei Co. Ltd. (Japan) as TO-2344, 2-(phenylthio)ethyl acrylate available from Miwon Specialty Chemical Co. Ltd. as M1162, biphenylmethyl acrylate available from Miwon Specialty Chemical Co. Ltd. as M1192, 2-naphthalenylthioethyl acrylate, and 2-(2-naphthyloxy)ethyl acrylate.

Furthermore, the free-radically polymerizable monomers may contain an average of two or more free-radically polymerizable groups. A molecule having three or more of such reactive groups can be present as well. Examples of such monomers include: $C_2$-$C_{18}$ alkylenediol di(meth)acrylates, $C_3$-$C_{18}$ alkylenetriol tri(meth)acrylates, the polyether analogues thereof, and the like, such as 1,6-hexanediol di(meth)acrylate, trimethylolpropane tri(meth)acrylate, triethylene glycol di(meth)acrylate, pentaerythritol tri(meth) acrylate, and tripropylene glycol di(meth)acrylate, and ditrimethylolpropane tetraacrylate, ethoxylated bisphenol fluorene diacrylate materials such as those from Miwon Specialty Chemical Co. Ltd. (Korea) as HR6060, HR6100, and HR6200. Vinyl and allyl ether monomers can be used as the ethylenically unsaturated monomer. Vinyl ether-containing monomers can be ethyl vinyl ether, tert-butyl vinyl ether, isobutyl vinyl ether, cyclohexyl vinyl ether, 2-ethylhexyl vinyl ether, diethylene glycol divinyl ether, triethylene glycol divinyl ether, 1,4-butanediol divinyl ether, 1,4-cyclohexanedimethanol mono vinyl ether, and 1,4-cyclohexanedimethanol divinyl ether, (all available from BASF Corp., Florham Park, N.J.). Other vinyl ether monomers include methyl vinyl ether and trimethylolpropane trivinyl ether. Useful allyl ether monomers include 1,3,5-tri-2-propenyl-1,3,5-Triazine-2,4,6(1H,3H,5H)-trione available as TAICROS from Evonik Performance Materials Gmbh (Hanau-Wolfgang, Germany), 2,4,6-tris(2-propenyloxy)-1,3,5-Triazine available as TAC from Evonik Performance Materials Gmbh, a mixture of di-, tri-, and tetra allyl ethers of pentaerythritol available as APE from Perstorp Holding AB (Malmo Sweden), and trimethylolpropane diallyl ether from Perstorp Holding AB. It is within the scope of the present disclosure to use a blend of more than one vinyl or allyl ether monomer.

It is also within the scope of the present disclosure to use one or more (meth)acrylate monomers blended with one or more vinyl or allyl ether monomers. The different kinds of monomers can be present in any proportion.

One-part polymerizable compositions according to the present disclosure can typically be prepared by simple mixing of the components, for example, with a blade or propeller mixer. Organic solvent may be added if desired to reduce viscosity. The solvent(s) may be evaporated after mixing and/or dispensing or coating onto a substrate, for example. Exemplary organic solvents include ketones (e.g., methyl ethyl ketone), esters, halocarbons, and ethers.

Likewise, two-part polymerizable compositions according to the present disclosure can be prepared typically by separately preparing the part A and part B components, for example, with a blade or propeller. When curing is desired, part A and part B are mixed together, for example, using a blade or static mixing nozzle to form the corresponding one-part polymerizable composition.

The one-part polymerizable compositions can be coated onto a substrate as desired prior to curing/polymerization.

Polymerizable compositions according to the present disclosure may be at least partially polymerized to form a polymerized composition. To initiate polymerization, the polymerizable composition may be exposed to heat or, preferably, to actinic radiation such as from a high-energy ultraviolet source, preferably having a duration and intensity of exposure to provide for essentially complete (greater than 80%) polymerization of the composition, although this is not a requirement.

Polymerized compositions according to the present disclosure will contain monomeric units derived from the terminally-unsaturated diarylsulfide compound used to make them.

Accordingly, polymerized compositions according to the present disclosure may comprise a polymer comprising polyvalent (e.g., divalent or tetravalent) segments represented by at least one of the formulas:

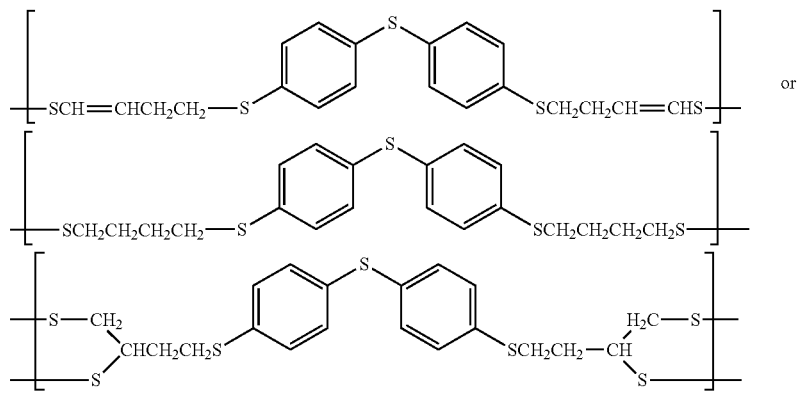

Exemplary substrates include glass (e.g., smooth or ground) substrates and plastic substrates. Polymerizable compositions of the present disclosure may be applicable to a variety of applications needing optical elements including, for example, optical assemblies, optical projection systems, such as projection televisions, as well as displays and other devices containing the optical assemblies.

Select Embodiments of the Present Disclosure

In a first embodiment, the present disclosure provides a composition comprising at least one terminally-unsaturated diarylsulfide compound represented by the formula:

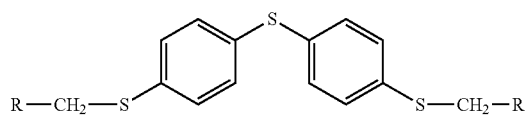

wherein each R represents an allyl group or a propargyl group.

In a second embodiment, the present disclosure provides a composition according to the first embodiment, wherein each R represents an allyl group.

In a third embodiment, the present disclosure provides a composition according to the first embodiment, wherein each R represents a propargyl group.

In a fourth embodiment, the present disclosure provides a composition according to any one of the first to third embodiments, further comprising an organic polythiol compound having at least two sulfhydryl groups.

In a fifth embodiment, the present disclosure provides a composition according to the fourth embodiment, wherein the organic polythiol compound has at least three sulfhydryl groups.

In a sixth embodiment, the present disclosure provides a composition according to the fourth or fifth embodiment, further comprising a free-radical photoinitiator.

In a seventh embodiment, the present disclosure provides a composition according to any one of the fourth to sixth embodiments, wherein at least one terminally-unsaturated diarylsulfide compound comprises:

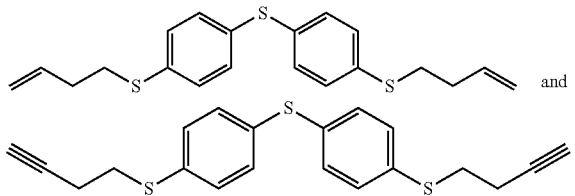

and

In an eighth embodiment, the present disclosure provides a method of making a polymerized composition, the method comprising at least partially polymerizing a composition according to any one of the fourth to seventh embodiments.

In a ninth embodiment, the composition further comprises at least one ethylenically unsaturated monomer, preferably monofunctional and/or difunctional acrylates and/or methacrylates.

In a tenth embodiment, the present disclosure provides a two-part polymerizable composition comprising a part A component and a part B component, wherein:

the part A component comprises at least one terminally-unsaturated diarylsulfide compound represented by the formula:

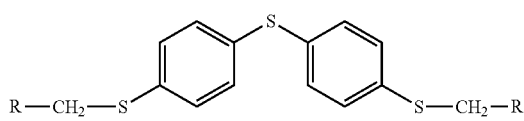

wherein each R represents an allyl group, or a propargyl group; and the part B component comprises an organic polythiol compound having at least two sulfhydryl groups, wherein the part A and part B components are not in intimate contact with each other.

In an eleventh embodiment, the present disclosure provides a two-part polymerizable composition according to the tenth embodiment, wherein each R represents an allyl group.

In a twelfth embodiment, the present disclosure provides a two-part polymerizable composition according to the tenth embodiment, wherein each R represents a propargyl group.

In a thirteenth embodiment, the present disclosure provides a two-part polymerizable composition according to any one of the tenth to twelfth embodiments, wherein the organic polythiol compound has at least three sulfhydryl groups.

In a fourteenth embodiment, the present disclosure provides a two-part polymerizable composition according to any one of the tenth to thirteenth embodiments, wherein at least one of the part A component and the part B component comprises a free-radical photoinitiator.

In a fifteenth embodiment, the present disclosure provides a two-part polymerizable composition according to the fourteenth embodiment, wherein the part B component comprises the free-radical photoinitiator.

In a sixteenth embodiment, the present disclosure provides a method of making a polymerized composition, the method comprising combining the part A and part B components of a composition according to the fourteenth or fifteenth embodiment, and at least partially polymerizing the resulting combination.

In a seventeenth embodiment, the present disclosure provides a polymer comprising polyvalent (e.g., divalent or tetravalent) segments represented by at least one of the formulas:

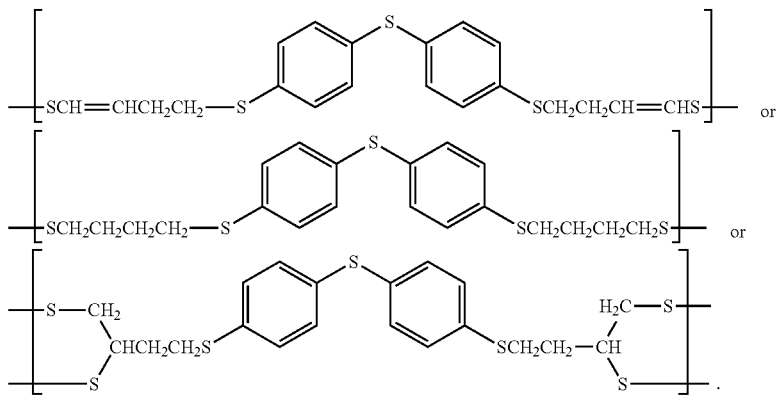

Objects and advantages of the present disclosure are further illustrated by the following non-limiting examples, but the particular materials and amounts thereof recited in these examples, as well as other conditions and details, should not be construed to unduly limit the present disclosure.

EXAMPLES

Unless otherwise noted, all parts, percentages, ratios, etc. in the Examples and the rest of the specification are by weight. In the Tables, NM means "not measured".

Table 1 lists descriptions and abbreviations of materials used in the Examples.

TABLE 1

| ABBREVIATION | DESCRIPTION |
|---|---|
| EX-1 | (structure: 4,4'-thiobis(phenylsulfanyl) with but-3-enyl groups on each end) |
| EX-2 | (structure: 4,4'-thiobis(phenylsulfanyl) with but-3-ynyl groups on each end) |
| CE-1 | (structure: 4,4'-thiobis(phenylsulfanyl) with allyl groups on each end) |
| 4,4'-thiobisbenzenethiol | 4,4'-thiobisbenzenethiol available from Millipore Sigma, St. Louis, Missouri |
| NaOH | Sodium hydroxide obtained from EMD Millipore, Billerica, Massachusetts |
| DMF | Dimethylformamide obtained from EMD Millipore |
| EtOAc | Ethyl acetate obtained from EMD Millipore |
| Brine | Saturated solution of sodium chloride in water |
| $Na_2SO_4$ | Sodium sulfate obtained from EMD Millipore |
| 4-bromobut-1-ene | 4-bromobut-1-ene obtained from EMD Millipore |
| Allyl bromide | Obtained from Alfa Aesar, Ward Hill, Massachusetts |
| $MgSO_4$ | Magnesium sulfate obtained from EMD Millipore |
| 4-bromobut-1-yne | 4-bromobut-1-yne obtained from GFS Chemicals, Columbus, Ohio |
| TEMPIC | Tris[2-(3-mercaptopropionyloxy)ethyl] isocyanurate obtained as THIOCURE TEMPIC from Bruno Bock Thiochemicals, Marschacht, Germany (structure shown) |
| DMPT | 2,3-Di((2-mercaptoethyl)thio)-1-propanethiol obtained as THIOCURE DMPT from Bruno Bock Thiochemicals, Marschacht, Germany (structure shown) |
| DMDO | 1,8-dimercapto-3,6-dioxaoctane obtained from Arkema, Colombes, France (structure shown) |
| DMDS | Bis(2-mercaptoethyl) sulfide obtained from Maruzen Chemical Trading Co., Ltd., Tokyo, Japan (structure shown) |

TABLE 1-continued

| ABBREVIATION | DESCRIPTION |
|---|---|
| TPO-L | Ethyl (2,4,6-trimethylbenzoyl)phenyl phosphinate available as OMNIRAD TPO-L from IGM Resins, Charlotte, North Carolina |

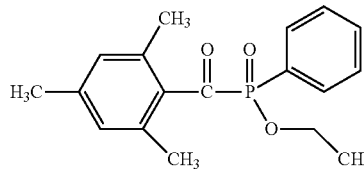

Refractive Index Measurements

Refractive index measurements of the liquid, uncured formulations were obtained using a Bausch and Lomb Abbe Refractometer (Bausch and Lomb, Rochester, N.Y.).

Refractive indices of powders were measured using a Nikon Eclipse optical transmission microscope (Tokyo, Japan). Slides were prepared by placing approximately 10 mg of powder onto a glass slide, adding a drop of immersion oil (standard refractive index matching liquid immersion oil obtained from Cargille-Sacher Laboratories, Inc., Cedar Grove, N.J.) of known refractive index, and subsequent covering with a coverslip. Measurements were taken according the Becke Line Test Procedure (ASTM C1648-12, "Standard Guide for Choosing a Method for Determining the Index of Refraction and Dispersion of Glass" (2012)).

Refractive indices of films of the cured formulations (optical coatings) were measured at 632.8 nanometers (nm), and optionally at 405 nm and 532 nm, using a Metricon 2010 Prism Coupler (Metricon Corporation Inc., Pennington, N.J.). The optical coating to be measured was brought into contact with the base of a Rutile prism, leaving an air gap of the order of 0.1 micrometer.

Photopolymerization

For each formulation, the appropriate resins and photoinitiator were weighed using a Mettler AE240 analytic balance (Mettler Toledo LLC, Columbus, Ohio) and added to a 0.5 ounce (14.8 mL) straight-walled polypropylene cup and sealed with a polypropylene threaded lid (both cups and lids available from FlackTek, Inc., Landrum, S.C.). Each formulation was hand stirred using a wooden applicator stick, followed by high shear mixing at 1500 revolutions per minute (rpm) for 20 seconds using a DAC 150 FVZ-K Speedmixer available from FlackTek, Inc., Landrum, S.C. After mixing, a small portion (approximately two drops) was transferred to the center of a 2 inches (51 mm)×3 inches (76 mm)×0.04 inch (1 mm) glass microscope slide (VWR, Radnor, Pa.). To the glass slide containing the liquid formulation, was placed a 1 inch (25 mm)×3 inch (76 mm)× 0.01 inch (0.3 mm) silicone rubber spacer (Lot 177573, # DSP7038GP-010-36, -70 DUROMETER red specification grade silicone, Diversified Silicone Products, Santa Fe, Calif.) that contained a 0.5 inch (13 mm) hole in the center through the use of a hand-operated hole punch (Model 448RH from M. C. Mieth Manufacturing Inc Port Orange, Fla.) such that the formulation was in the center of the hole. A 1 inch (25 mm)×3 inch (76 mm)×0.04 inch (1 mm) glass microscope slide (Model 2950 from Thermo Fisher Scientific (Waltham, Mass.) was placed on top of the formulation such that the formulation was sandwiched between the glass slides. This sandwich construction was clamped along the narrow edges using one small metal binder clip (Model 10667CT) and one mini metal bonder clip (Model 10666CC), both available from Staples Inc. Framingham, Mass. The degree of conversion was determined by transmission Fourier transform infrared spectroscopy (FTIR). The samples were analyzed using a Thermo Fisher Scientific NICOLET iS50 infrared spectrophotometer equipped with a liquid nitrogen cooled mercury cadmium telluride (MCT) detector, with the thiol and "ene" peaks integrated using OMNIC software from Thermo Fisher Scientific. The conversion, also known as degree of polymerization, was determined by the ratio of the integration areas under the curves after light exposure, to those of the uncured samples. The region integrated for the thiol peak was 2600-2490 $cm^{-1}$, and the range for the ene/yne peaks was 6145-6090 $cm^{-1}$.

Nuclear Magnetic Resonance (NMR) Spectroscopy

Nuclear magnetic spectroscopy (NMR) measurements of terminally-unsaturated diarylsulfide compounds were taken using the following procedure. Approximately 100 milligrams of sample were dissolved in 0.5 mL of deuterated chloroform ($CDCl_3$) and NMR spectra were acquired on a Bruker AVANCE III 500 MHz spectrometer (Bruker BioSpin Corporation, Billerica, Mass.) equipped with a broadband cryoprobe. Proton ($^1H$) spectra were acquired with a low tip angle (15°) and a relaxation delay of 4 seconds. Carbon ($^{13}C$) spectra were acquired with a 300 tip angle and a relaxation delay of 3 seconds with continuous $^1H$-decoupling.

Example 1

This example demonstrates the synthesis of EX-1, below.

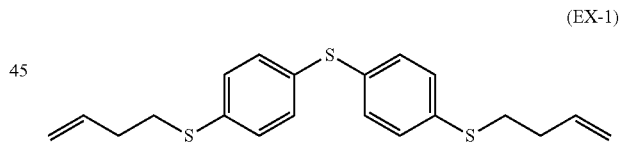

(EX-1)

To a 250-mL round-bottom flask was added 25 g (100 mmol) of 4,4'-thiobisbenzenethiol followed by addition of 20 mL of N,N-dimethylformamide (DMF). The solution was stirred and cooled under ice bath. To the stirring solution was added an aqueous solution of NaOH (10 g in 80 mL water). The resulting suspension was stirred under a nitrogen atmosphere, and to it was added dropwise 33.75 g (25 mL, 250 mmol) of 4-bromobut-1-ene. The solution was warmed to room temperature (RT) and stirred overnight under a room temperature $N_2$ atmosphere.

The crude solution was then diluted in EtOAc, and the organic part was twice extracted using 25 mL of 1 normal (N) NaOH, subsequently washed with water three times, and followed by washing with brine. The organic layer was then dried over magnesium sulfate ($MgSO_4$), filtered, and the solvent was evaporated to yield the final product (36 g, quantitative) as a yellow oil. $^1H$ NMR (500 MHZ, $CDCl_3$): δ=7.22-7.26 (m, 8H), 5.81-5.87 (m, 2H), 5.05-5.11 (m, 4H), 2.95-2.98 (t, 4H), 2.37-2.41 (m, 4H). $^{13}C$ NMR (125 MHz, $CDCl_3$): δ=136.3, 136.0, 133.1, 131.6, 129.7, 116.6, 33.3, 33.0. The measured refractive index of EX-1 (Bausch and Lomb Abbe Refractometer, 589 nm) was in the range of 1.6366-1.6525.

Example 2

This example demonstrates the synthesis of EX-2, below.

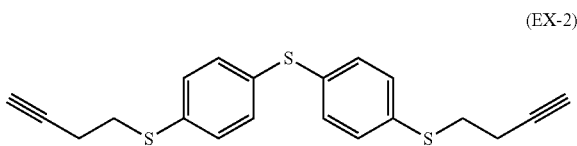 [SMILES: C#CCCSc1ccc(Sc2ccc(SCCC#C)cc2)cc1]

(EX-2)

To a 500-mL round-bottom flask equipped with a stir bar, 25 g (100 mmol) of 4,4'-thiobisbenzenethiol and 15 mL of DMF were added, followed by the addition of aqueous NaOH (10 g in 100 mL water). The resulting suspension was cooled in an ice bath. To the suspension (still under ice bath), was added dropwise 33 g (250 mmol) of 4-bromobut-1-yne. The suspension was then warmed to room temperature. The resulting mixture was cloudy and after stirring for 1 hour, solidification into a light gray solid was observed. This solid could be easily broken up with a glass rod. An additional 50 mL of EtOAc was added and allowed to stir overnight under nitrogen. The suspension was then diluted with additional EtOAc and the organic portion was extracted using a separatory funnel. The organic layer was then twice washed with 25 mL of 1 N NaOH, subsequently washed with water three times, and followed by washing brine. The organic phase was then dried over sodium sulfate ($Na_2SO_4$), filtered, and concentrated using a rotary evaporator. The product was obtained as an off-white solid (23.6 g, 67% yield). $^1$H NMR (500 MHZ, $CDCl_3$): δ=7.23-7.31 (m, 9H (solvent peak obscured), 3.068 (t, 4H), 2.498 (dt, 4H), 2.052 (t, 2H). $^{13}$C NMR (125 MHz, $CDCl_3$): δ=134.7, 133.7, 131.7, 130.6, 82.2, 70.0, 32.8, 19.4.

The refractive index of the powder was compared against that of immersion oils of known refractive index according to the refractive index measurement test method used for powders as described above. The material was noticed to exhibit non-isotropic behavior with some crystals showing a lower refractive index than others. The lowest refractive index measured was between 1.6186 and 1.6210, while the highest refractive index measured was between 1.6509 and 1.6530. This non-isotropic behavior is likely due to having different crystal orientations relative to the optical path of the light since the crystals were randomly aligned in the samples. Therefore, the refractive index range was from 1.6186-1.6530.

Comparative Example CE-1

This example demonstrates the synthesis of CE-1, below.

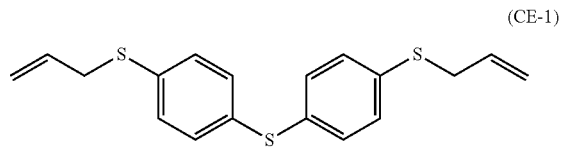 [SMILES: C=CCSc1ccc(Sc2ccc(SCC=C)cc2)cc1]

(CE-1)

To a 500-mL round-bottom flask was added 50 g (200 mmol) of 4,4'-thiobisbenzenethiol. The flask was placed over an ice bath, and to it was added aqueous NaOH (17.2 g in 100 mL water) followed by the addition of 30 mL DMF. The suspension was stirred under a nitrogen atmosphere, and to it was then added dropwise 63.54 g (45.5 mL, 525 mmol) of allyl bromide. The solution was warmed to room temperature and stirred overnight under a room temperature $N_2$ atmosphere. The crude solution was then diluted in EtOAc and the organic part was twice extracted using 25 mL 1 N NaOH, subsequently washed with water three times, and followed by washing with brine. The organic layer was dried over $Na_2SO_4$, filtered, and the solvent was evaporated to yield the final product (55 g, 83%) as a light yellow oil. $^1$H NMR (500 MHZ, $CDCl_3$): δ=7.21-7.26 (8H, m), 5.82-5.91 (2H, m), 5.08-5.17 (4H, m), 3.53-3.54 (4H, m). $^{13}$C NMR (125 MHz, $CDCl_3$): δ=135.4, 133.4, 133.39, 131.4, 130.3, 118.1, 37.1. The measured refractive index of CE-1 (Bausch and Lomb Abbe Refractometer, 589 nm) was equal to 1.660-1.6705.

General Procedure for Generating Films

Each formulation was coated between two sheets of silicone-treated polyethylene terephthalate (PET) film having a thickness of 0.003 inch (76.2 micrometers) using a knife coater having a 0.004 inch (101.6 micrometers) knife gap set by a feeler gauge. The film samples were cured with four or eight passes under a 600 Watt/inch Fusion D bulb at 95 feet per minute (fpm) (30 meters per minute), with nominally 6000 milliwatts per square centimeter ($mW/cm^2$) irradiation per pass, and approximately 500 millijoule per square centimeter ($mJ/cm^2$) irradiation energy per pass using a LH-10 Curing system equipped with a DRS-10 conveyor from Heraeus Noblelight America LLC (Gaithersburg, Md.).

Examples 3 to 9 (EX-3 to EX-9) and Comparative Examples 2 and 3 (CE-2 and CE-3)

EX-1 and CE-1 "ene" monomers were reacted with either tris[2-(3-mercaptopropionyloxy)ethyl]isocyanurate (TEMPIC, obtained as THIOCURE TEMPIC from Bruno Bock Thiochemicals, Marschacht, Germany) or 2,3-di((2-mercaptoethyl)thio)-1-propanethiol (DMPT, obtained as THIOCURE DMPT from Bruno Bock Thiochemicals, Marschacht, Germany) thiols. A thiol:ene stoichiometry of 1:1 was used for all formulations, and the reactions were initiated using OMNIRAD TPO-L photoinitiator (TPO-L) at 0.7 parts per hundred resin (phr). Formulations for Examples 3 to 5 (EX-3 to EX-5) and Comparative Examples 2 and 3 (CE-2 and CE-3) are shown in Table 2. Formulations for Examples 6 to 9 (EX-6 to EX-9) are shown in Table 5.

Table 3 shows the cure profiles of the formulations listed in Table 2 measured after 4 and 8 passes under a 600 Watt/inch Fusion D bulb according to the GENERAL PROCEDURE FOR GENERATING FILMS. Table 4 shows the refractive index of EX-3, EX-4, and EX-5 listed in Table 2 in their uncured and cured states.

TABLE 2

| | ENE COMPONENT | | | THIOL | | | TPO-L |
|---|---|---|---|---|---|---|---|
| EXAMPLE | IDENTITY | AMOUNT, g | MILLI-EQUIVALENTS | IDENTITY | AMOUNT, g | MILLI-EQUIVALENTS | AMOUNT, g |
| EX-3 | EX-1 | 1.49 | 8.3 | TEMPIC | 1.48 | 8.4 | 0.022 |
| EX-4 | EX-1 | 3.50 | 19.5 | DMPT | 1.70 | 19.6 | 0.038 |

TABLE 2-continued

| | ENE COMPONENT | | | THIOL | | | TPO-L |
|---|---|---|---|---|---|---|---|
| EXAMPLE | IDENTITY | AMOUNT, g | MILLI-EQUIVALENTS | IDENTITY | AMOUNT, g | MILLI-EQUIVALENTS | AMOUNT, g |
| EX-5 | EX-1 | 1.51 | 8.4 | TEMPIC | 1.47 | 8.4 | 0.023 |
| CE-2 | CE-1 | 2.51 | 15.2 | TEMPIC | 2.68 | 15.3 | 0.036 |
| CE-3 | CE-1 | 2.50 | 15.1 | DMPT | 1.31 | 15.1 | 0.027 |

TABLE 3

| | CONVERSION, % | | | |
|---|---|---|---|---|
| | 4 PASSES | | 8 PASSES | |
| EXAMPLE | ENE | THIOL | ENE | THIOL |
| EX-3 | 66 | 57 | 72 | 61 |
| EX-4 | 73 | 66 | NM | NM |
| EX-5 | 68 | 58 | 68 | 58 |
| CE-2 | 1 | 1 | 2 | 3 |
| CE-3 | 1 | 1 | NM | NM |

TABLE 4

| | REFRACTIVE INDEX | |
|---|---|---|
| EXAMPLE | UNCURED (589 nm) | CURED (633 nm) |
| EX-3 | 1.609 | 1.6164 |
| EX-4 | 1.638 | 1.6834 |
| EX-5 | 1.614 | 1.6157 |

Table 5 shows the thiol-ene and thiol-yne formulations using EX-1 and EX-2, respectively, with various multifunctional thiols. Table 6 shows the cure profiles of the formulations listed in Table 5 after 4 four passes under a 600 Watt/inch Fusion D bulb at approximately 95 fpm, with approximately 6000 milliwatts per square centimeter (mW/cm$^2$) irradiation per pass, and 512 millijoule per square centimeter (mJ/cm$^2$) irradiation energy per pass using a LH-10 Curing system equipped with a DRS-10 conveyor from Heraeus Noblelight America LLC (Gaithersburg, Md.). Table 7 shows the refractive index of EX-6 to EX-9 listed in Table 5 in their uncured and cured states.

TABLE 5

| | ENE/YNE COMPONENT | | | | THIOL | | | TPO-L |
|---|---|---|---|---|---|---|---|---|
| | EX-1 | | EX-2 | | | | | |
| EXAMPLE | AMOUNT, g | MILLI-EQUIVALENTS | AMOUNT, g | MILLI-EQUIVALENTS | IDENTITY | AMOUNT, g | MILLI-EQUIVALENTS | AMOUNT, g |
| EX-6 | 3.71 | 20.7 | 0.20 | 2.3 | DMPT | 2.01 | 23 | 0.0413 |
| EX-7 | 5.21 | 29.7 | 0.29 | 3.3 | DMDO | 3.01 | 33 | 0.0602 |
| EX-8 | 4.42 | 24.6 | 0.12 | 1.3 | DMDS | 2.03 | 26 | 0.0445 |
| EX-9 | 4.61 | 25.7 | 0.25 | 2.9 | TEMPIC | 5.00 | 29 | 0.0713 |

TABLE 6

| | % CONVERSION AFTER 4 PASSES | |
|---|---|---|
| EXAMPLE | ENE/YNE | THIOL |
| EX-6 | 66 | 61 |
| EX-7 | 79 | 75 |
| EX-8 | 60 | 51 |
| EX-9 | 60 | 50 |

TABLE 7

| | REFRACTIVE INDEX | | | |
|---|---|---|---|---|
| | UNCURED | CURED FILM | | |
| EXAMPLE | 589 nm | 405 nm | 532 nm | 633 nm |
| EX-6 | 1.639 | 1.745 | 1.695 | 1.680 |
| EX-7 | 1.600 | 1.695 | 1.652 | 1.638 |
| EX-8 | 1.629 | 1.749 | 1.702 | 1.687 |
| EX-9 | 1.595 | 1.671 | 1.632 | 1.619 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A composition comprising at least one terminally-unsaturated diarylsulfide compound represented by the formula:

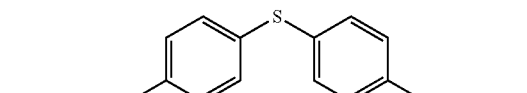

wherein each R represents an allyl group or a propargyl group.

2. The composition of claim 1, wherein each R represents an allyl group.

3. The composition of claim 1, wherein each R represents a propargyl group.

4. The composition of claim 1, further comprising an organic polythiol compound having at least two sulfhydryl groups.

5. The composition of claim 4, wherein the organic polythiol compound has at least three sulfhydryl groups.

6. The composition of claim 4, further comprising a free-radical photoinitiator.

7. The composition of claim 4, wherein at least one terminally-unsaturated diarylsulfide compound comprises:

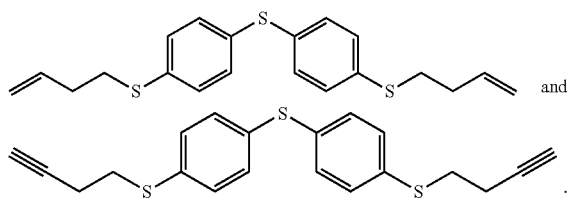

and

8. A method of making a polymerized composition, the method comprising at least partially polymerizing the composition of claim 7.

9. A two-part polymerizable composition comprising a part A component and a part B component, wherein:
 the part A component comprises a terminally-unsaturated diarylsulfide compound represented by the formula:

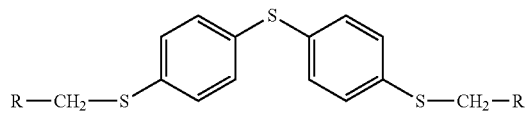

wherein each R represents an allyl group, or a propargyl group; and
 the part B component comprises an organic polythiol compound having at least two sulfhydryl groups, wherein the part A and part B components are not in intimate contact with each other.

10. The two-part polymerizable composition of claim 9, wherein each R represents an allyl group.

11. The two-part polymerizable composition of claim 9, wherein each R represents a propargyl group.

12. The two-part polymerizable composition of claim 9, wherein the organic polythiol compound has at least three sulfhydryl groups.

13. The two-part polymerizable composition of claim 9, wherein at least one of the part A component and the part B component comprises a free-radical photoinitiator.

14. The two-part polymerizable composition of claim 13, wherein the part B component comprises the free-radical photoinitiator.

15. A method of making a polymerized composition, the method comprising combining the part A and B components of the composition of claim 13, and at least partially polymerizing the resulting combination.

\* \* \* \* \*